United States Patent
Wekke

(10) Patent No.: US 10,656,775 B2
(45) Date of Patent: May 19, 2020

(54) REAL-TIME PROCESSING OF DATA AND DYNAMIC DELIVERY VIA AN INTERACTIVE INTERFACE

(71) Applicant: BANK OF AMERICA CORPORATION, Charlotte, NC (US)

(72) Inventor: Wendy Marie Wekke, Newark, DE (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 268 days.

(21) Appl. No.: 15/877,716

(22) Filed: Jan. 23, 2018

(65) Prior Publication Data

US 2019/0227673 A1 Jul. 25, 2019

(51) Int. Cl.
*G06F 3/048* (2013.01)
*G06F 3/0481* (2013.01)
(Continued)

(52) U.S. Cl.
CPC .......... *G06F 3/0481* (2013.01); *G06F 3/1423* (2013.01); *G06T 11/60* (2013.01);
(Continued)

(58) Field of Classification Search
CPC ........ G06F 3/0482; G06F 3/016; G06F 3/165; G06F 3/04842; G06F 3/01; G06F 3/167; G06F 3/0481; G06F 3/16; G06F 3/013; G06F 3/042; G06F 3/0236; G06F 17/243; G06F 17/273; G06F 9/453; G06F 3/04886; G06F 3/14; G06F 3/147; G06F 3/1423; G06T 2200/24; G06T 11/60; G06T 5/002; H04L 65/1069; H04L 29/06; G09G 2370/04

See application file for complete search history.

(56) References Cited

U.S. PATENT DOCUMENTS 5,493,608 A 2/1996 O'Sullivan
6,757,362 B1 6/2004 Cooper et al.
(Continued)

OTHER PUBLICATIONS

Adelyn Zhou; "How Artificial Intelligence is Transforming Enterprise Customer Service"; Forbes, Feb. 27, 2017; https://www.forbes.com/sites/adelynzhou/2017/02/27/how-artificial-intelligence-is-transforming-enterprise-customer-service/#7184391d1483.

*Primary Examiner* — Ariel Mercado
(74) *Attorney, Agent, or Firm* — Michael A. Springs; Moore & Van Allen PLLC; Vaidehi Bachoti

(57) ABSTRACT

Embodiments of the invention are directed to systems, methods, and computer program products for real-time processing of data and dynamic delivery via and interactive interface. In some embodiments, the system is configured to facilitate a communication session between an entity system associated with an entity user and a user device associated with a first user. The system is further configured to perform one or more user activities, in an integrated manner, within a single integrated interface, without requiring the entity user to operate disparate applications and navigate multiple interfaces. Moreover, the system is configured to identify, in real-time, session inputs associated with the communication session to be provided to the first user. The system may also transmit a trigger communication to the entity user via a first peripheral device associated with the entity system, such as an audio head set and a display device.

20 Claims, 7 Drawing Sheets

(51) Int. Cl.
    *G06F 3/16*     (2006.01)
    *G06F 3/14*     (2006.01)
    *H04L 29/06*     (2006.01)
    *G06T 11/60*     (2006.01)
    *G06T 5/00*     (2006.01)

(52) U.S. Cl.
    CPC .......... *H04L 65/1069* (2013.01); *G06T 5/002* (2013.01); *G06T 2200/24* (2013.01); *G09G 2370/02* (2013.01); *G09G 2370/04* (2013.01)

(56) References Cited

U.S. PATENT DOCUMENTS

| | | |
|---|---|---|
| 7,110,525 B1 | 9/2006 | Heller et al. |
| 7,305,345 B2 | 12/2007 | Bares et al. |
| 7,606,714 B2 | 10/2009 | Williams et al. |
| 8,379,830 B1 | 2/2013 | Naik et al. |
| 8,515,765 B2 | 8/2013 | Baldwin et al. |
| 8,644,488 B2 | 2/2014 | Byrd et al. |
| 8,694,324 B2 | 4/2014 | Di Fabbrizio et al. |
| 8,914,294 B2 | 12/2014 | Di Fabbrizio et al. |
| 9,064,006 B2 | 6/2015 | Hakkani-Tur et al. |
| 9,189,742 B2 | 11/2015 | London |
| 9,386,152 B2 | 7/2016 | Riahi et al. |
| 9,601,104 B2 | 3/2017 | Cecchi et al. |
| 9,645,994 B2 | 5/2017 | Agarwal et al. |
| 9,652,714 B2 | 5/2017 | Achin et al. |
| 9,710,829 B1 | 7/2017 | Sitapara et al. |
| 9,858,901 B2 * | 1/2018 | Deering .................. G06F 3/013 |
| 2003/0220917 A1 | 11/2003 | Copperman et al. |
| 2006/0192775 A1 * | 8/2006 | Nicholson ............... G06F 3/013 |
| | | 345/211 |
| 2009/0287489 A1 | 11/2009 | Savant |
| 2010/0205667 A1 * | 8/2010 | Anderson ............... G06F 3/013 |
| | | 726/19 |
| 2013/0152092 A1 | 6/2013 | Yadgar |
| 2014/0101263 A1 * | 4/2014 | Wu ......................... H04L 51/18 |
| | | 709/206 |
| 2014/0214676 A1 | 7/2014 | Bukai |
| 2014/0270109 A1 | 9/2014 | Riahi et al. |
| 2014/0282083 A1 * | 9/2014 | Gaetano, Jr. ............ H04L 51/04 |
| | | 715/752 |
| 2015/0134330 A1 | 5/2015 | Baldwin et al. |
| 2016/0140635 A1 * | 5/2016 | Devageorge ............ H04L 67/02 |
| | | 705/26.41 |
| 2016/0179323 A1 * | 6/2016 | Kashi ..................... G06F 16/29 |
| | | 715/708 |
| 2017/0124457 A1 | 5/2017 | Jerram et al. |
| 2018/0181766 A1 * | 6/2018 | Engel .................. G06F 3/04842 |
| 2018/0359530 A1 * | 12/2018 | Marlow ................ G06F 16/783 |

* cited by examiner

REAL-TIME PROCESSING OF DATA AND DYNAMIC DELIVERY VIA AN INTERACTIVE INTERFACE

FIELD OF THE INVENTION

The present invention is directed to, in general, facilitating intelligent and responsive communication sessions between individuals. Furthermore, the present invention is configured to integrate technology and functionality of a plurality of interfaces, proactively and in real-time, to facilitate the communication sessions.

BACKGROUND

Existing systems are configured for telephonic communication between individuals. However, existing systems fail to anticipate activities associated with the telephonic communication. Moreover, existing systems are not capable of harnessing other devices associated with the individuals for facilitating the telephonic communication. There is a need for a novel system structured for facilitating proactive, predictive and intelligent interactive communication sessions between individuals. Furthermore, there is a need for a system that is structured to transform the communication sessions between individuals by harnessing the functionality of associated devices.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an enhanced communication platform configured for real-time processing of data and dynamic delivery via and interactive interface, without requiring users to operate disparate applications. The system is further structured for establishing intelligent and responsive communication with a distributed network. Furthermore, the system is configured to receive and transmit signals through multiple communication channels and switch between the various communication channels seamlessly, and in real-time.

Embodiments of the invention relate to systems, methods, and computer program products for real-time processing of data and dynamic delivery via and interactive interface. The system is structured for establishing intelligent and responsive communication with a distributed network. The invention comprises: at least one memory device with computer-readable program code stored thereon; at least one communication device; and at least one processing device operatively coupled to the at least one memory device and the at least one communication device. Typically, executing the computer-readable code is configured to cause the at least one processing device to: identify a current communication session between an entity system associated with an entity user and a user device associated with a first user, wherein the communication session comprises an audio conversation between the entity user and the first user; construct an integrated graphical user interface based on at least analyzing activity data associated with the first user; initiate presentation of the integrated graphical user interface on a first display device associated with the entity system; determine a session input to be provided by the entity user to the first user during the current communication session; transmit a trigger communication to the entity user via a first peripheral device associated with the entity system, wherein the trigger communication comprises the session input to be provided by the entity user to the first user during the current communication session; and initiate execution of a first user activity associated with the current communication session based on at least (i) determining that the entity user has provided the session input to the first user via the audio conversation in response to the trigger communication, and (ii) receiving a user response associated with the session input. Typically, the system is structured to display the trigger communication to the entity user via at least one of (i) the first display device and (ii) an audio head set associated with the entity system, wherein the trigger communication comprises the session input to be provided by the entity user to the first user during the current communication session.

In one embodiment, or in combination with the previous embodiment, initiating presentation of the integrated graphical user interface on the first display device associated with the entity system further comprises: determining that a user view zone of the entity user matches a display area associated with the first display device, and initiating display of the integrated graphical user interface on a display portion of the display area of the first display device that overlaps the user view zone of the entity user.

In one embodiment, or in combination with any of the previous embodiments, initiating display of the integrated graphical user interface on the display portion of the display area that overlaps the user view zone further comprises: determining that the first display device is currently turned off, and transmitting, to the entity system, a control signal that is configured to cause the entity system to turn on the first display device prior to displaying the integrated graphical user interface.

In one embodiment, or in combination with any of the previous embodiments, initiating presentation of the integrated graphical user interface on the first display device associated with the entity system further comprises: identifying a plurality of display devices associated with the entity system, and determining the first display device of the plurality of display devices based on at least (i) determining that the first display device is configured to display the integrated graphical user interface, (ii) determining that the first display device is within a predetermined proximity of a location of the entity user, (iii) determining that the entity user is currently active on the first display device, and (iv) determining that an auxiliary entity user is not currently active on the first display device.

In one embodiment, or in combination with any of the previous embodiments, determining that the entity user is currently active on the first display device comprises at least one of determining that a user view zone associated with the entity user matches a display area associated with the first display device, and identifying a predetermined action associated with the first display device performed by the entity user within a predetermined time interval.

In one embodiment, or in combination with any of the previous embodiments, displaying the trigger communication to the entity user via the audio head set further comprises: identifying that the audio head set is currently adorned by the entity user; and in response to determining that the first user is not currently providing an audio input during the audio conversation between the entity user and the first user, transmitting the trigger communication to the audio head set to cause the audio head set to present the trigger communication to the entity user in an audio format, wherein the audio format comprises a sound level in a range below an average sound level of previous audio inputs of the first user received at the audio head set during the current communication session and above an absolute threshold of hearing (ATH).

In one embodiment, or in combination with any of the previous embodiments, displaying the trigger communication to the entity user via the first display device further comprises: transmitting the trigger communication to the first display device to cause the first display device to present a visual display of the trigger communication to the entity user on a display portion of a display area of the first display device that overlaps a user view zone of the entity user, wherein the trigger communication is configured to cause the first display device to apply a predetermined Gaussian blur to the display area of the first display device that is not associated with the trigger communication.

In one embodiment, or in combination with any of the previous embodiments, constructing the integrated graphical user interface further comprises: determining a plurality of user tasks associated with the first user based on at least analyzing the activity data associated with the first user; identifying a plurality of distributed systems associated with performing the plurality of user tasks, wherein each of the distributed systems is structured to facilitate performing at least one of the plurality of user tasks; identifying, for a first system of the plurality of systems, a first graphical action interface associated with performing at least one of the plurality of user tasks; identifying, for a second system of the plurality of systems, a second graphical action interface associated with performing at least one of the plurality of user tasks; and constructing the integrated graphical user interface comprising a composite interface of the first graphical action interface and the second graphical action interface.

In one embodiment, or in combination with any of the previous embodiments, determining a plurality of user tasks further comprises: identifying the first user activity associated with the communication session between the entity user and the first user based on at least (i) analyzing an audio input provided by the first user during the audio conversation between the entity user and the first user, and (ii) correlating the audio input with the activity data associated with the first user; wherein the plurality of user tasks associated with the first user comprise the first user activity.

In one embodiment, or in combination with any of the previous embodiments, the activity data associated with the first user comprises historical activity data associated with the first user, user resource data and user social media data.

In one embodiment, or in combination with any of the previous embodiments, constructing the integrated graphical user interface comprising the composite interface further comprises: analyzing a plurality of interfaces of a first activity application associated with the first system to determine the first graphical action interface associated with performing at least one of the plurality of user tasks; identifying a first portion of the first graphical action interface that is associated with performing at least one of the plurality of user tasks; and constructing the integrated graphical user interface such that the composite interface comprises the first portion of the first graphical action interface.

In one embodiment, or in combination with any of the previous embodiments, determining the session input to be provided by the entity user to the first user during the current communication session further comprises: determining the session input based on at least (i) analyzing an audio input provided by the first user during the audio conversation between the entity user and the first user, and (ii) correlating the audio input with the activity data associated with the first user.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
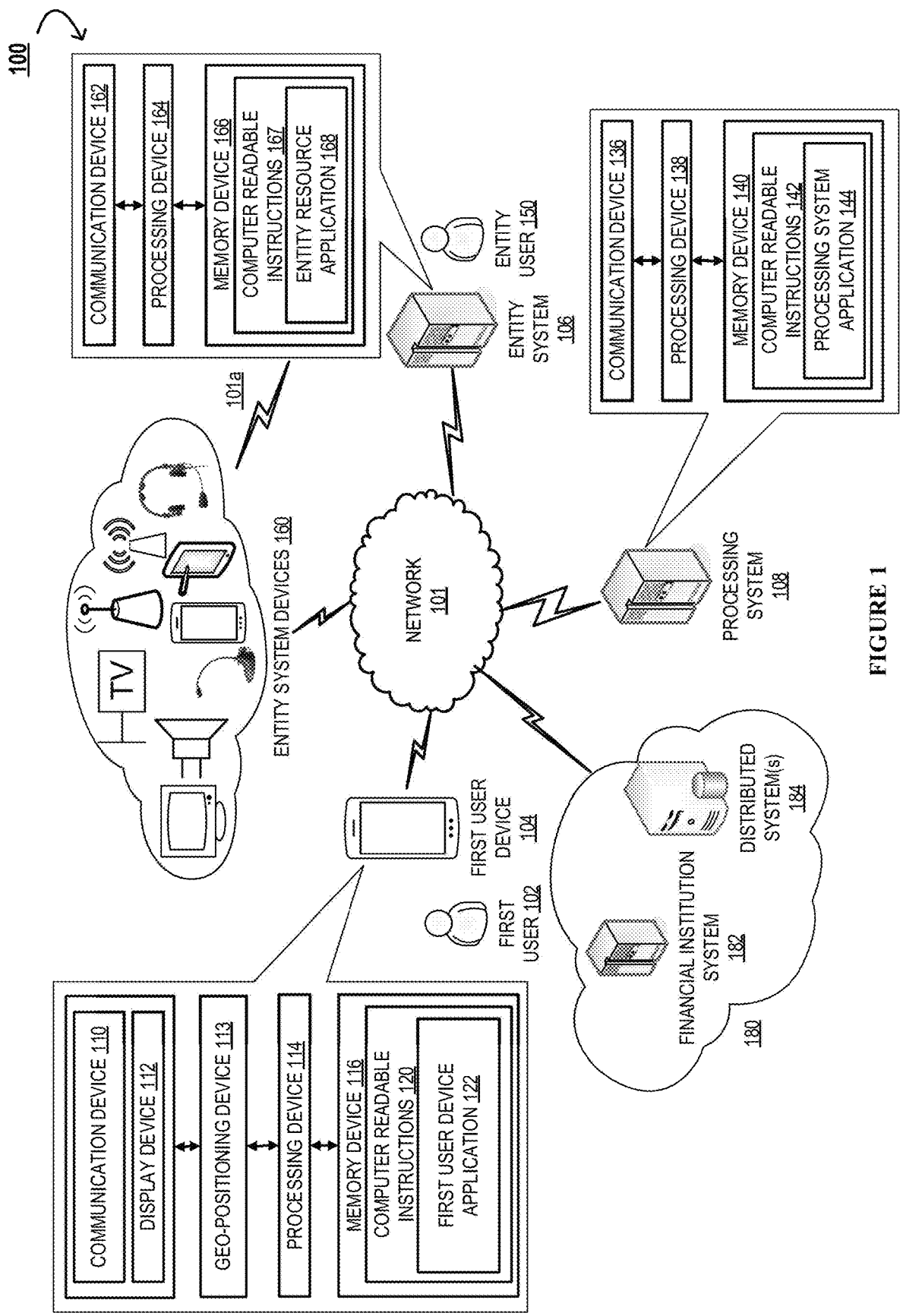
Figure 2:
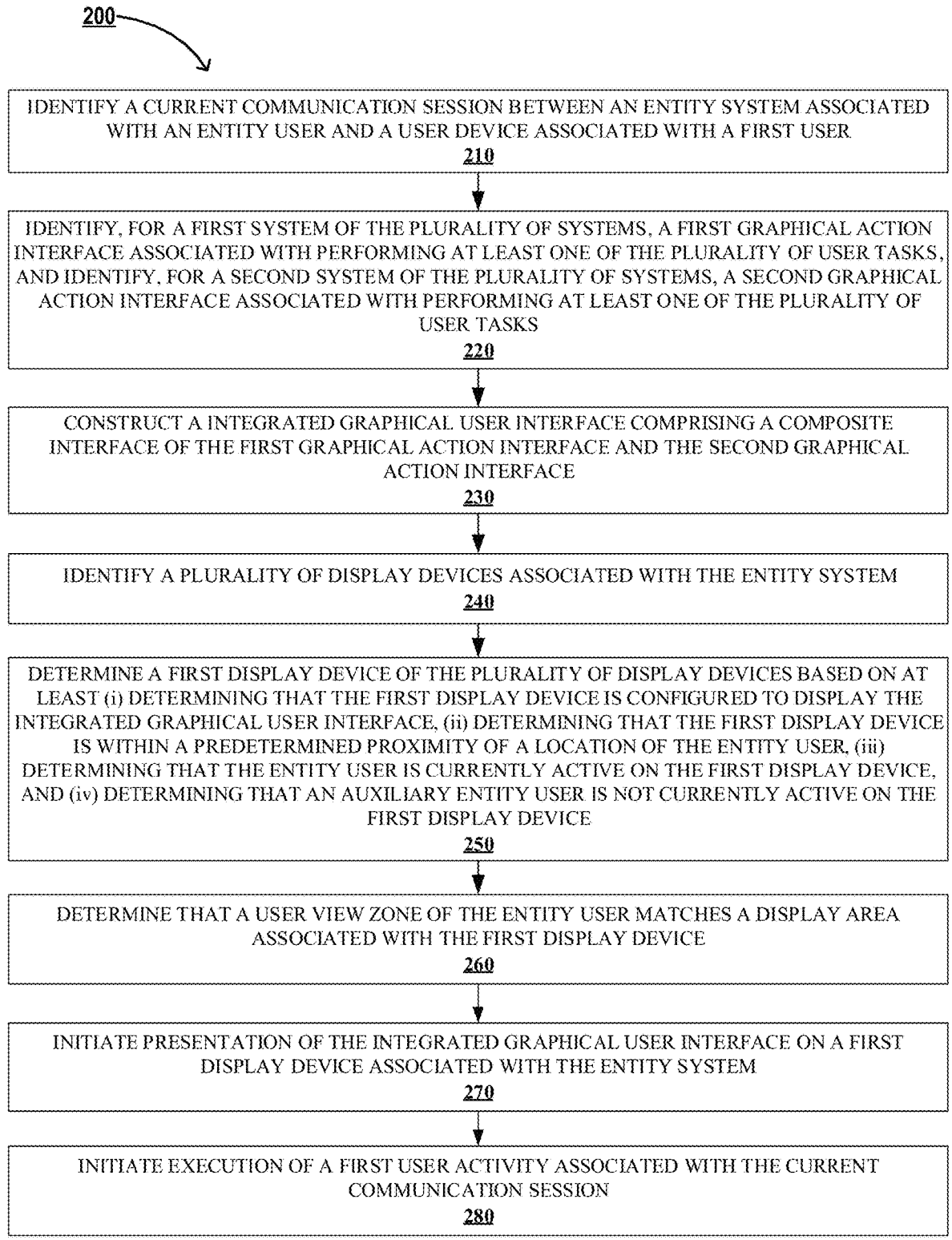
Figure 3:
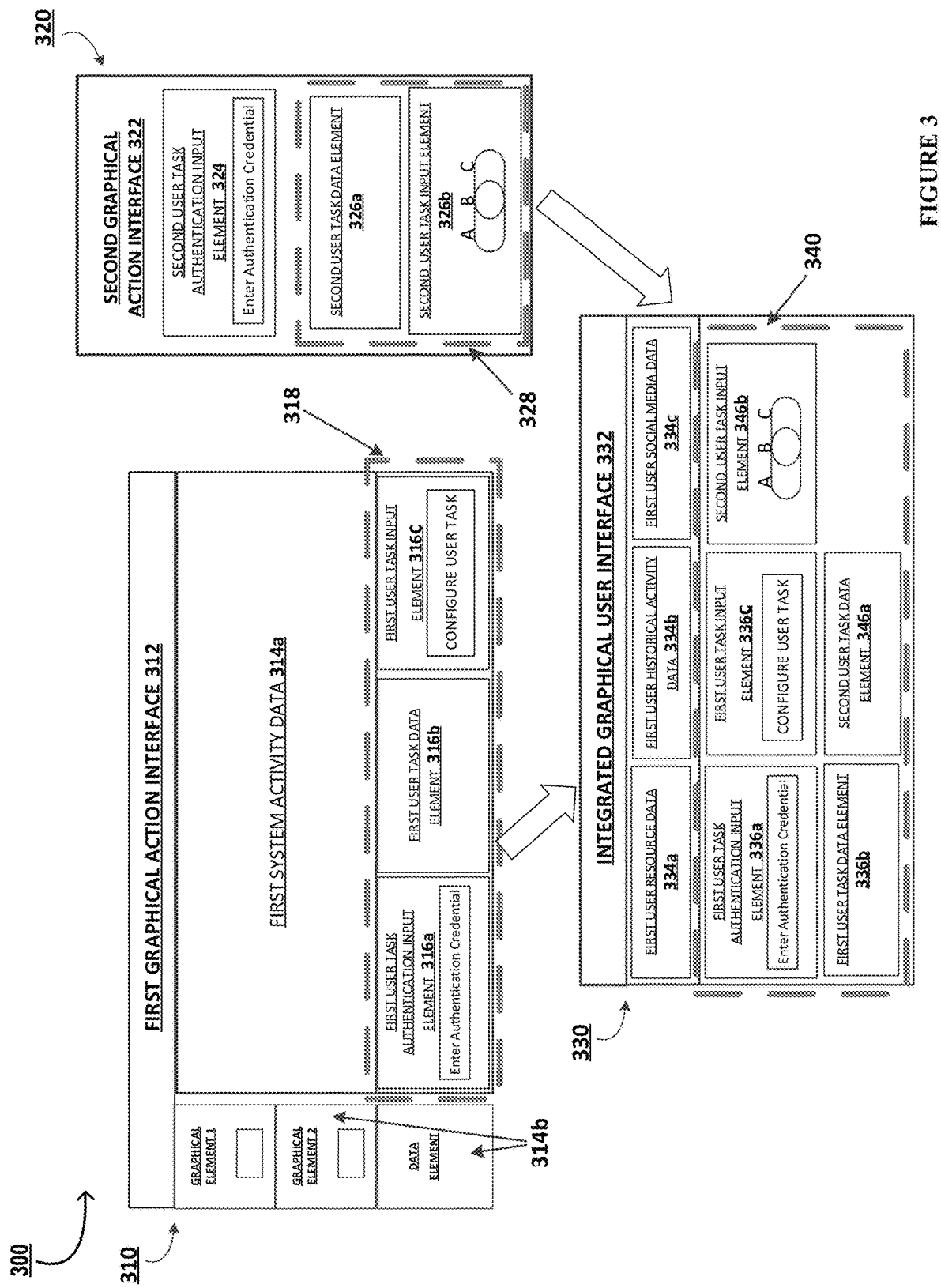
Figure 4:
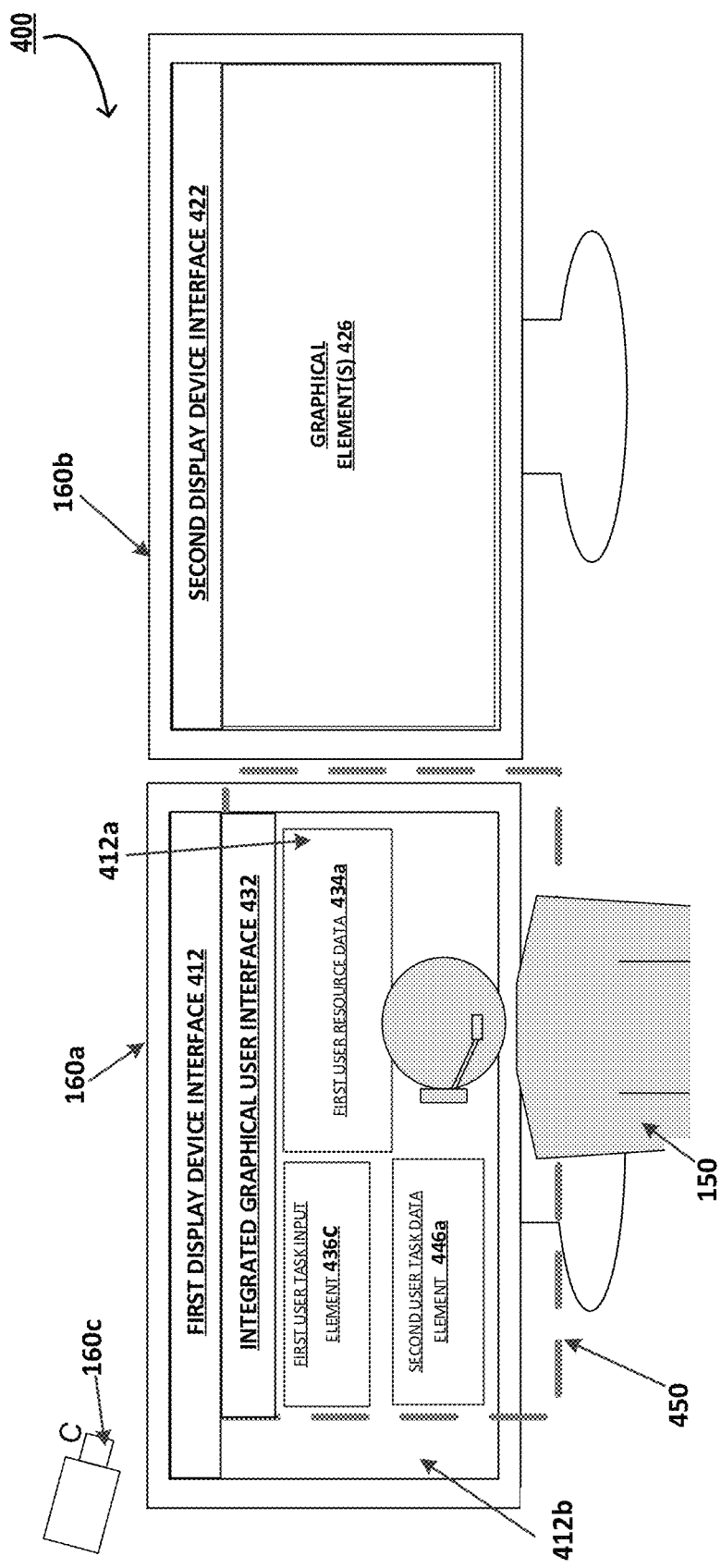
Figure 5:
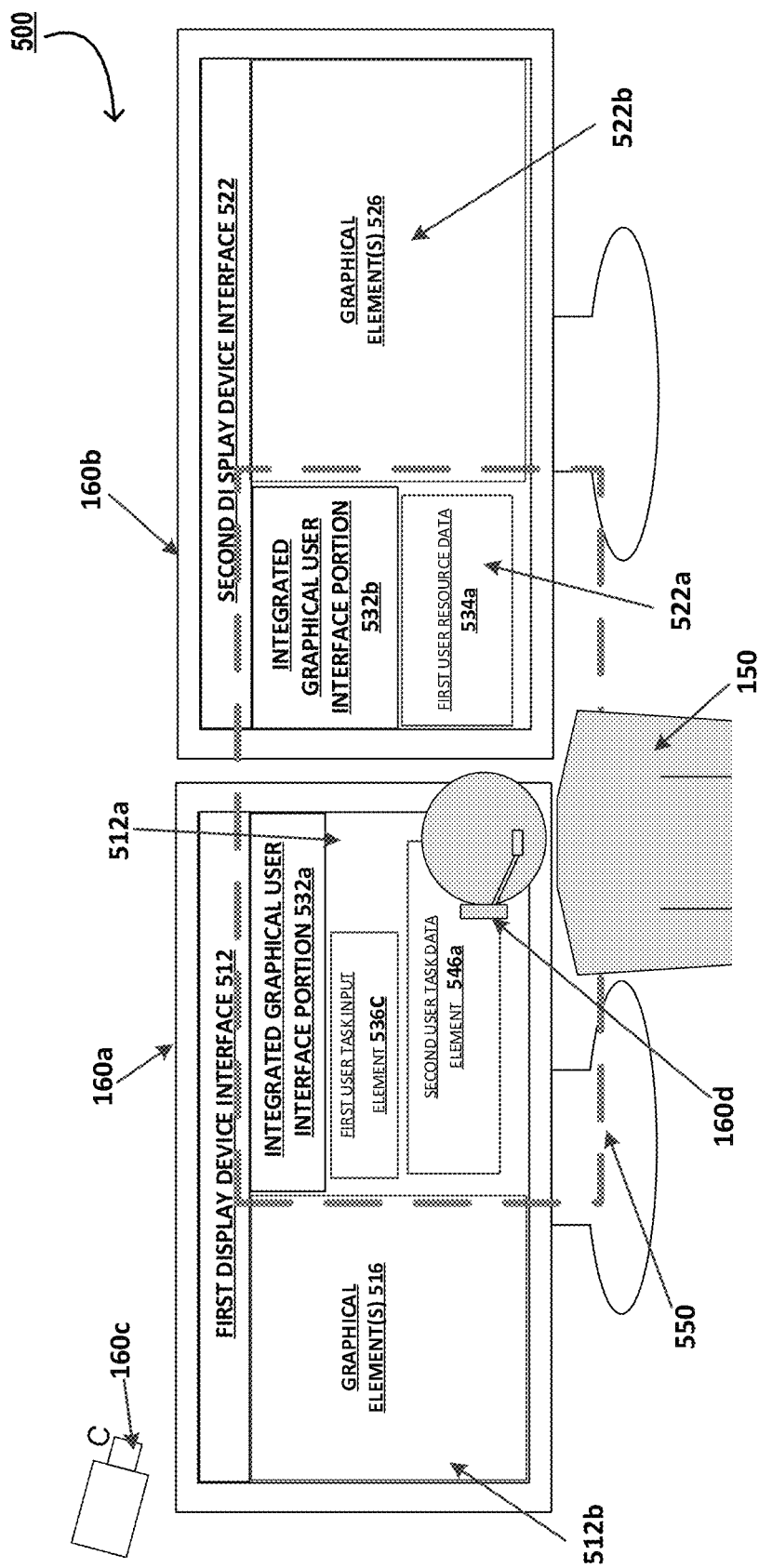
Figure 6:
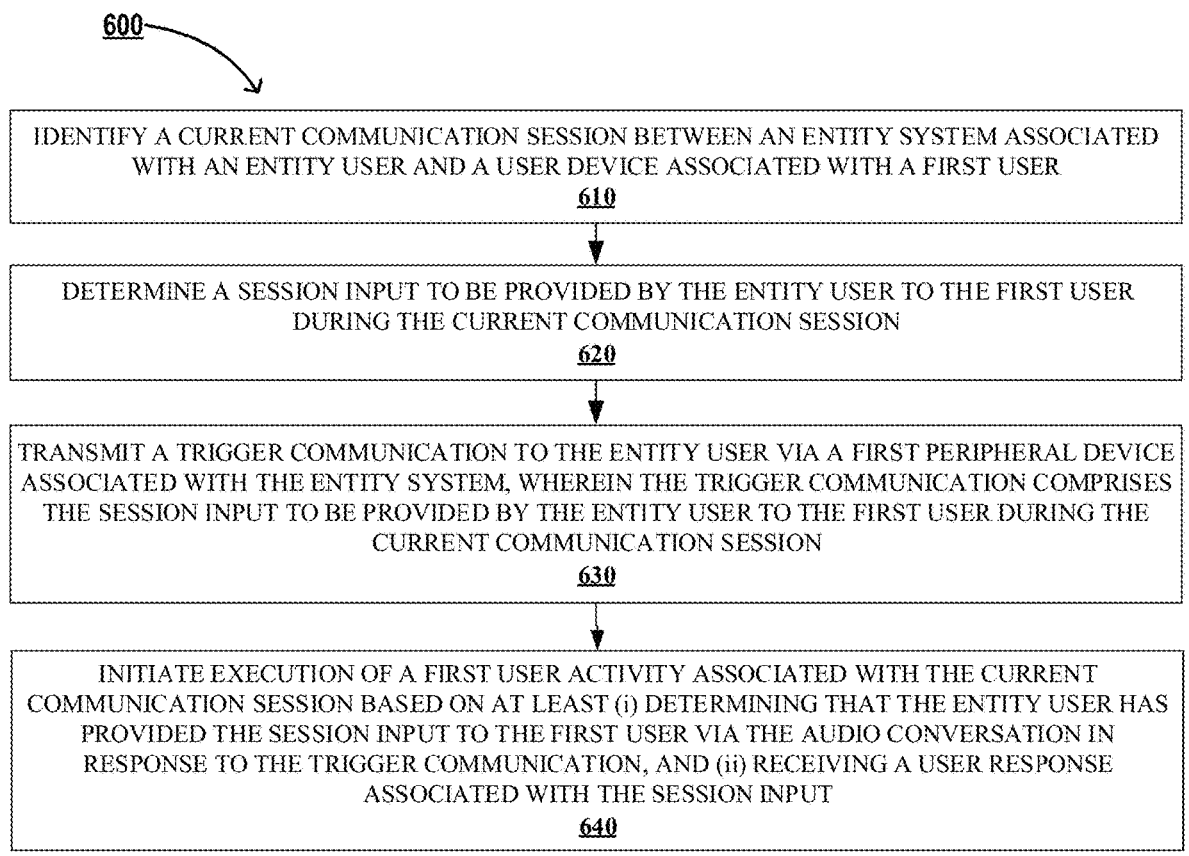
Figure 7:
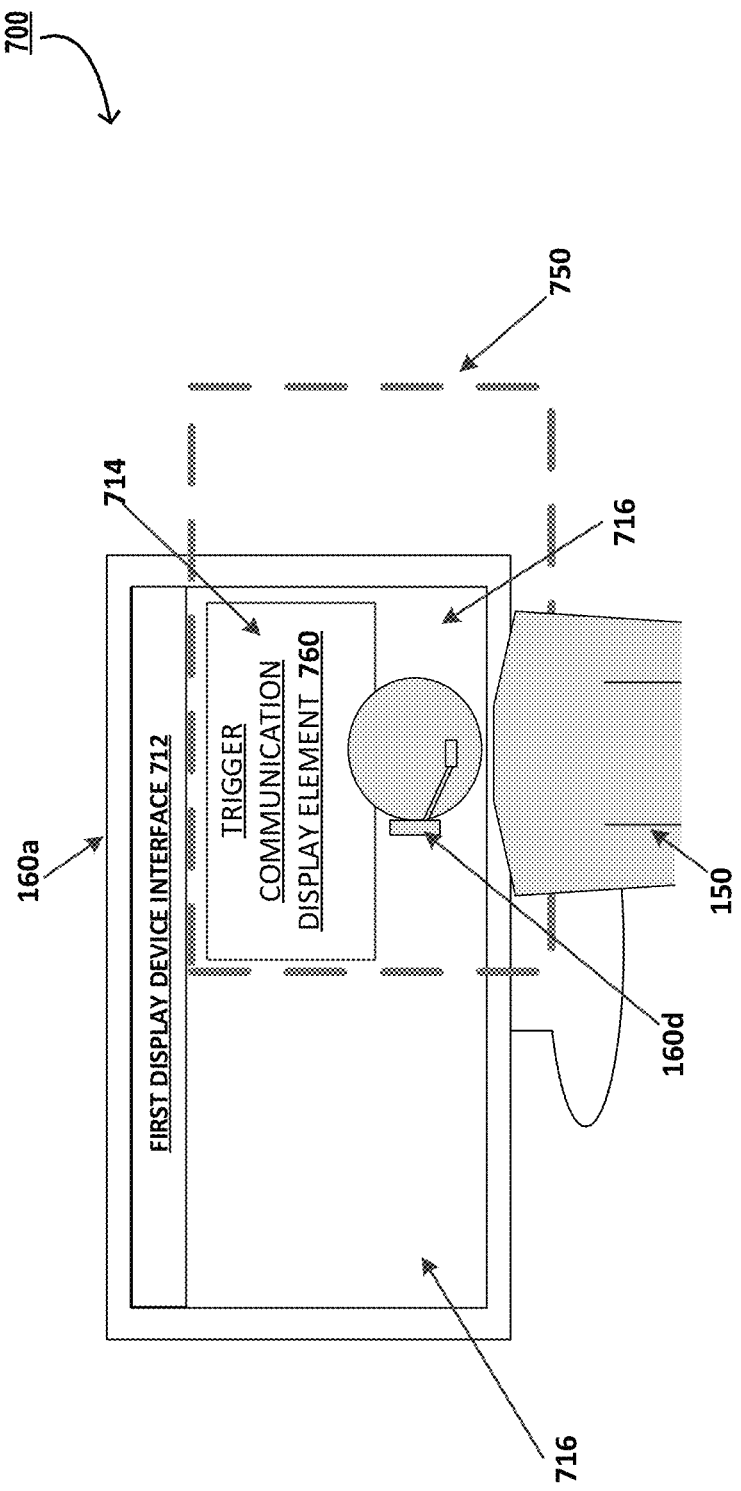

Having thus described embodiments of the invention in general terms, reference will now be made to the accompanying drawings, wherein:

FIG. 1 depicts an enhanced communication platform environment 100, in accordance with one embodiment of the present invention;

FIG. 2 illustrates a high level process flow 200 for real-time processing of data and dynamic delivery via and interactive interface, in accordance with one embodiment of the present invention;

FIG. 3 illustrates a schematic depiction 300 associated with construction of an integrated graphical user interface 332, in accordance with one embodiment of the present invention;

FIG. 4 illustrates a display environment 400 for presenting an integrated graphical user interface, in accordance with one embodiment of the present invention;

FIG. 5 illustrates a display environment 500 for presenting an integrated graphical user interface, in accordance with one embodiment of the present invention;

FIG. 6 illustrates a high level process flow 600 for real-time processing of data and dynamic delivery via and interactive interface, in accordance with one embodiment of the present invention; and FIG. 7 illustrates a display environment 700 for presenting a trigger communication, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, resource sharing systems and the like. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity and/or a financial institution. In some embodiments, a "user" or "entity" may be an employee (e.g., an associate, a project manager, a specialist, a manager, an administrator, an internal operations analyst, or the like) of the entity or enterprises affiliated with the entity, capable of operating the systems described herein. In some embodiments, a "user" or "first user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a first user may be an individual or entity with one or more relationships, affiliations or accounts with the entity (for example, the merchant, the financial institution). In some embodiments, an entity user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "first user" and "customer" may be used interchangeably.

In some embodiments, "resources" or "resource" or "at least one resource" as used herein may refer to products, services, financial accounts, possessions, merchandise, properties, goods and the like associated with an individual or user. A "credential instrument," "technology resource" or "account" may be the relationship that the first user has with the entity (e.g., a financial institution). Examples of credential instruments include a deposit account, such as a transactional account (e.g. a banking account), a savings account, an investment account, a money market account, a time deposit, a demand deposit, a pre-paid account, a credit account, a non-monetary user information that includes only personal information associated with the user, or the like. The credential instrument or account is typically associated with and/or maintained by an entity, and is typically associated with technology infrastructure such that the resource or account may be accessed, modified or acted upon by the user electronically, for example using or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more credential instruments or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface. Typically, a graphical user interface (GUI) is a type of interface that allows users to interact with graphical elements such as graphical icons and visual indicators such as secondary notation (e.g., via a screen, via pointer devices, via gestures, via spatial sensing, etc.), as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. The graphical user interface may also be configured to be presented on one or more display devices associated with user devices that are configured for providing real or virtual interactive projections of the interface.

A user activity, resource activity, user task or a technology activity, such as a "resource transfer" or "transaction" or "resource provisioning activity", may refer to any electronic activities or communication between the first user and the entity (e.g., financial institution). A resource transfer (e.g., having a resource transfer value or amount) may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" refers to any activity initiated between a user and a resource entity such as a merchant, between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "first user" may refer to a customer or the like, who utilizes an external apparatus such as a user device, for conducting communication sessions with the entity system (i.e., with an entity user). The external apparatus may be a user device (computing devices, mobile devices, wearable smart devices, augmented reality (AR) headset devices, smart phone devices, smart television devices, and the like), a payment instrument (credit cards, debit cards, checks, digital wallets, currency, loyalty points), and/or payment credentials (account numbers, payment instrument identifiers). In some embodiments, the user may perform transactions by swiping payment instruments at a transaction terminal, for example, by swiping a magnetic strip of a credit card along a magnetic reader of a transaction terminal. In some embodiments, the transactions may be performed by wireless communication or "tapping" between the customer device and a transaction terminal. In accordance with some embodiments of the invention, the term "tap" or "tapping" may refer to bringing an external apparatus close to or within a predetermined proximity of the activity interface device or transaction terminal interface, or entity system devices, so that information (such as encrypted tokens, financial resource/account identifiers, and the like) can be communicated wirelessly between the external apparatus and the devices using short range wireless transmission technology, such near-field communication (NFC) technology, radio-frequency (RF) technology, audio-frequency communication, or the like. Tapping may include physically tapping the first user device against an appropriate portion of the entity system device or the transaction terminal or it may include only waving or holding the first user device near an appropriate portion of the entity system device or the transaction terminal without making physical contact with the transaction terminal.

In accordance with embodiments of the invention, the term "credential instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

FIG. 1 illustrates enhanced communication management platform environment 100 with integrated resource activity features, in accordance with one embodiment of the present invention. The enhanced communication management platform is structured for real-time processing of data and dynamic delivery via and interactive interface, as will be described below. As illustrated in FIG. 1, a processing system 108, configured for providing an intelligent, proactive and responsive application or system at one or more devices 160 of an entity system 106 and/or user device 104, is structured for establishing intelligent and responsive communication with a distributed network.

The processing system 108 (referred to as "the system" or "the system 108") is operatively coupled, via a network 101 to an entity system 106, to one or more devices 160 of the entity system 106, to one or more user devices 104, to other external distributed network systems 180 such as financial institution system(s) 182 and/or a plurality of distributed systems 184 (e.g., merchant systems, entity/merchant databases etc.), and other external systems/third-party servers not illustrated herein. In this way, the processing system 108 can send information to and receive information from an entity system 106, one or more devices 160 of the entity system 106, one or more user devices 104, and/or external distributed network systems 180 such as financial institution system(s) 182 and/or a plurality of distributed systems 184, to provide an enhanced communication platform, particularly for an entity user 150 of the entity system 106. As referred to herein, user device 104 or first user device 104 may refer to a device employed by a first user 102 (e.g., a customer of an entity) to conduct a communication session with the entity user 150 (e.g., a specialist, employee, expert, associate, or representative associated with the entity).

At least a portion of the enhanced communication platform is typically configured to reside on the processing system 108 (for example, at the processing system application 144). In some instances, at least a portion of the enhanced communication platform is typically configured to reside on the entity system 106 (for example, at the entity resource application 168). In some instances, at least a portion of the enhanced communication platform is typically configured to reside on the first user device 104 (for example, at the first user device application 122), on and/or on other devices. Furthermore, the enhanced communication platform is capable of seamlessly integrating user-specific and/or resource specific user activity/task functionality into an integrated/composite interface of the entity resource application 168 and is typically infinitely customizable by the system 108 and/or the entity user 150.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the entity system 106 and one or more of the entity system devices 160, (for example, based on receiving an audio user input), as illustrated by communication channel 101*a*. Therefore, the system, via the network 101 may establish, operative connections between otherwise incompatible devices, for example by establishing a communication channel 101*a* between the entity system 106 and the entity system devices 160. In this regard, the network 101 (and particularly the communication channels 101*a*) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, against an appropriate portion of the entity system device 160 or it may include only waving or holding the external apparatus near an appropriate portion of the entity system device without making physical contact with the entity system device.

In some embodiments, the first user 102 is an individual that wishes to conduct a communication session with the entity system 106 and/or the entity user 150 for the purposes of performing a user activity or task (e.g., financial activities, non-financial activities, purchases, information queries, etc.). For conducting the user activity or task requested by the first user 102, in some embodiments, the entity user 150 may access the entity system 106, the processing system 108, the financial institution system 182 and/or other systems, through a graphical user interface comprising a webpage or an entity resource application. Hereinafter, the term "application" is used to refer to an application (e.g., application 122, application 168, application 144, etc.), a widget, a webpage accessed through a browser, and the like. In some embodiments the application is a processing system application 144, stored on the processing system 108, configured for performing one or more steps described herein. In some embodiments the application is an entity resource application 168, stored on the entity system 106. In some embodiments the user application is a first user device application 122, referred to as a user application 122 herein, stored on the first user device 104. In some embodiments the application 122 may refer to a third party application or another user application stored on a cloud accessed by the processing system 108 and/or the entity system devices 160 through the network 101. In some embodiments, at least a portion of the processing system application 144 may be stored on the memory device 140 of the processing system 108, and the graphical user interfaces (e.g., integrated/composite user interfaces) maybe presented on display devices (e.g., screens, monitors, computers, tablets, smart devices etc.) of the entity system devices 160. The user 150 may subsequently navigate through the interface, perform one or more searches or initiate one or more activities or resource transfers using the interface (e.g., graphical user interface 332, graphical user interface 432, graphical user interface (532*a*, 532*b*), graphical user interface 712) provided by the processing system application 144, via the entity resource application 168, on one or more of the entity system devices 160. In some embodiments, a purchase may be made by the first user 102, during the communication session, which may then be executed by the entity user 150 using the displayed interface (e.g., graphical user interface 332, graphical user interface 432, graphical user interface (532*a*, 532*b*), graphical user interface 712). In some embodiments the entity user 150 requests and/or receives additional information from the processing system 108 and/or the first user device 104 for authenticating the first user 102 and/or the first user device 104, determining appropriate transaction queues, performing the transactions and other functions.

FIG. 1 also illustrates the first user device 104. The first user device 104 herein refers to one or more user devices, wherein each device may generally comprise a communication device 110, a display device 112, a geo-positioning device 113, a processing device 114, and a memory device 116. The first user device 104 is a computing system that allows a user 102 to interact with other systems to conduct communication sessions, initiate or to complete activities, resource transfers, and transactions for products, and the like. The processing device 114 is operatively coupled to the communication device 110 and the memory device 116. The processing device 114 uses the communication device 110 to communicate with the network 101 and other devices on the network 101, such as, but not limited to the entity system 106, the entity system devices 160 and/or the processing system 108. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 1. The display device 112 may comprise a screen, a speaker, a vibrating device or other devices configured to provide information to the user. In some embodiments, the display device 112 provides a presentation of the user interface. The geo-positioning device 113 may comprise global positioning system (GPS) devices, triangulation devices, accelerometers, and other devices configured to determine the current geographic location of the first user device 104 with respect to satellites, transmitter/beacon devices, telecommunication towers and the like. In some embodiments the first user device 104 may include authentication devices like fingerprint scanners, heart-rate monitors, microphones and the like that are configured to receive bio-metric authentication credentials from the user. In some embodiments the first user device 104 may include speakers, microphones and the like.

The first user device 104 comprises computer-readable instructions 120 stored in the memory device 116, which in one embodiment includes the computer-readable instructions 120 of the first user device application 122. In this way, users 102 may authenticate themselves, initiate activities, and interact with entity users 150 or the entity system devices 160, communicate with the processing system 108, authorize a transaction, conduct an interactive virtual exploration of a resource, and/or complete user activity or transaction, typically, using a telephonic/audio communication session. As discussed previously, the first user device 104 may be, for example, a desktop personal computer, a mobile system, such as a cellular phone, smart phone, personal data assistant (PDA), laptop, wearable device, a smart TV, a smart speaker, a home automation hub, augmented/virtual reality devices, or the like. The computer readable instructions 120, when executed by the processing device 114 are configured to cause the first user device 104 and/or processing device 114 to perform one or more steps, or to cause other systems/devices to perform one or more steps described herein.

As further illustrated in FIG. 1, the processing system 108 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the entity system 106, the entity system devices 160, the first user device 104, the external distributed systems 180. As such, the communication device 136 generally comprises a modem, server, wireless transmitters or other devices for communicating with devices on the network 101.

As further illustrated in FIG. 1, the processing system 108 comprises computer-readable instructions 142 stored in the memory device 140, which in one embodiment includes the computer-readable instructions 142 of a processing system application 144 (also referred to as a "system application"). The computer readable instructions 142, when executed by the processing device 138 are configured to cause the system 108/processing device 138 to perform one or more steps described in this disclosure to cause out systems/devices to perform one or more steps described herein. In some embodiments, the memory device 140 includes a data storage for storing data related to user activities/transactions and resource entity information, but not limited to data created and/or used by the processing system application 144.

As further illustrated in FIG. 1, the entity system 106 (substantially similar to the processing system 108) generally comprises a communication device 162, at least one processing device 164, and a memory device 166. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 164 is operatively coupled to the communication device 162 and the memory device 166. The processing device 164 uses the communication device 162 to communicate with the network 101 and other devices on the network 101, such as, but not limited to the processing system 108, the entity system devices 160, the first user device 104, the external distributed systems 180. As such, the communication device 162 generally comprises a modem, server, wireless transmitters or other devices for communicating with devices on the network 101.

As further illustrated in FIG. 1, the entity system 106 comprises computer-readable instructions 167 stored in the memory device 166, which in one embodiment includes the computer-readable instructions 167 of a processing system application 168 (also referred to as a "system application"). The computer readable instructions 167, when executed by the processing device 164 are configured to cause the system 108/processing device 164 to perform one or more steps described in this disclosure to cause out systems/devices to perform one or more steps described herein. In some embodiments, the memory device 166 includes a data storage for storing data related to user activities/transactions and resource entity information, but not limited to data created and/or used by the processing system application 168. Although indicated as being separate systems, in some embodiments, the processing system 108 and the entity system 106 may be embodied in a single system.

FIG. 1, further illustrates one or more entity system devices 160 associated with the entity system 106, in communication with the network 101. The entity system devices 160 may comprise peripheral devices such as headsets, speakers, microphones, smart speakers, and the like, display devices such as screens, monitors, touchscreens, and the like, desktop personal computers, a mobile system, such as a cellular phone, smart phone, and the like, personal data assistant (PDA) devices, laptops, wearable devices, a smart TV, a smart speaker, a home automation hub, augmented/virtual reality devices, cameras/visual capture devices, proximity sensors, beacon devices, or the like. These devices may be associated with the entity user 150.

FIG. 1, further illustrates external distributed systems 180, such as a financial institution system 182 and other distributed system(s) 184 which are configured for performing one or more user activities or tasks, at least in part, for example via native interfaces of the respective systems.

In the embodiment illustrated in FIG. 1, and described throughout much of this specification, a "system" or the "processing system 108" or the "system 108" is configured for performing one or more steps described herein, either alone or in conjunction with the entity system 106, one or more entity system devices 160, first user device 104, external systems 180 and the like.

The functions, and features of the enhanced communication platform will now be described in detail. As such, the integrated/composite interface described herein, in some embodiments, is configured to function as an intelligent personal assistant and resource navigator and is configured to perform one or more resource activities by harnessing the functionality of multiple applications resident on distributed systems which are proactively provided on a single interface, without requiring the entity user to access and navigate multiple interfaces. In particular, the system is configured to present an integrated user interface (e.g., graphical user interface 332, graphical user interface 432, graphical user interface (532a, 532b), graphical user interface 712) for the communication session with the first user, which are customized, in real-time, in accordance with the audio conversation of the session, for execution of one or more user activities such as resource allocation, communicating and performing associated resource activities and functions. As such, the integrated user interface is configured to allow the entity user perform one or more user resource sharing/allocation and associated activities of the first user in a convenient, proactive and timely manner, in-parallel with the audio conversation.

Moreover, in some embodiments, the integrated interface (e.g., graphical user interface 332, graphical user interface 432, graphical user interface (532*a*, 532*b*), graphical user interface 712) is presented, in real-time, based on determining optimal devices for presentation and optimal modes of presentation, thereby transforming the communication session by harnessing the functionality of a variety of distinct devices. The optimal devices and modes of presentation are further correlated with user characteristics such as user location and user view zones to provide a real-time transformation of the presentation of the interfaces customized based on current user characteristics. As such, the system is configured to employ the foregoing technical features of the enhanced communication platform to perform a myriad of user activities. The various functions and features of the invention, will now be described herein. It is understood that these functions and features employ some or all of the aforementioned technical features.

FIG. 2 illustrates a high level process flow 200 real-time processing of data and dynamic delivery via and interactive interface, in accordance with one embodiment of the present invention. One or more of the steps described herein may be performed by the processing system 108, for example, in response to the processing device 138 executing computer readable instructions 142 of the processing system application 144, in some embodiments. Typically, the system is configured to initiate presentation of interfaces of an entity resource application 168 on display devices associated with the entity system 106. In this regard, the system is configured to transmit, store, activate and/or invoke the entity resource application 168 on the entity system 106.

As indicated by block 210, the system is structured to identify a current communication session between an entity system associated with an entity user and a user device associated with a first user. Typically, the communication session comprises an audio conversation between the entity user 150 and the first user 102, such as a telephonic conference, or audio-visual conference. In some embodiments, the system identifies the current communication session at the time of initiation (e.g., based on receiving a first contact communication or call from the first user) or identifies the current communication session already in progress. In some embodiments, in response to receiving the first contact communication or call from the first user or in response to identifying a user activity/task associated with the first user, an appropriate entity user or representative may be identified by the system. Here the system may identify a suitable entity user or representative based on identifying that the entity user has experience with that particular first user, knowledge with a particular account in arrears, or general expertise regarding a field associated with current or predicted products/counts/needs of the first user. The system may identify and match the first user with the appropriate entity user or representative based on these factors.

In some embodiments, in response to receiving the first contact communication or call from the first user or in response to identifying a user activity/task associated with the first user, the system may allow the entity user or representative to initiate the communication session with the first user. Allowing the entity user to initiate the communication session with the first user may be based on the determined regulations and restrictions (e.g., internal restrictions, legal restrictions, time-zone restrictions, preferred contact times and devices, or first user preferences). In some embodiments, the system, i.e., based on the regulations and restrictions will not allow the entity user to communicate with the first user. In some embodiments, the system, i.e., based on the regulations and restrictions may warn against communicating with the first user.

In some embodiments, the system is structured to analyze the activity data associated with the first user, prior to and/or during the current communication session (for example, to identify suitable user activities/tasks associated with the first user). In some embodiments, the activity data associated with the first user comprises historical activity data associated with the first user, user resource data and user social media data. The activity data, and the user resource data in particular, may comprise, customer relationships across the entity. In this way, the system may identify all products that the first user may have with the entity across one or more lines of business within the entity. As such, addresses, affiliates, phone numbers, customer products, products with payments that are in arrears, and any other information that may be associated with the first user may be gathered across the lines of business of the entity. Moreover, the data associated with the first user relationships may be collected and compiled in association with the first user.

As discussed, the system is configured to construct, a customer-specific, proactive integrated interface for the communication session that corresponds to the conversation of the communication session in real-time. Here, at block 220, the system is structured to determine plurality of user tasks associated with the first user based on at least analyzing the activity data associated with the first user. In some embodiments, the plurality of user tasks comprises likely user activities or reasons for which the first user initiates the communication session. In some embodiments, the plurality of user tasks comprises potential user activities related to the first user. In some embodiments, the system identifies the first user activity associated with the communication session between the entity user and the first user based on at least (i) analyzing an audio input provided by the first user during the audio conversation between the entity user and the first user, and (ii) correlating the audio input with the activity data associated with the first user. For example, the system may audio input provided by the first user indicating that the user seeks to purchase a new product (e.g., an automobile loan). The system may correlate the purchase of the new product (user activity/task) with activity data of the first user (e.g., existing resources/accounts, account balances, social media updates, etc.) to identify suitable products, geographical area of the required product availability, and the timeframe for initiating the purchase of the products, and hence identify a first user task of purchasing a predetermined type of product at a predetermined time interval. Next, the system may identify a second user task of purchasing an auxiliary product associated with the first task, such as automobile insurance. Based on analyzing the user resource/account data, the system may further identify that the first user has the opportunity to save a predetermined amount from a checking account, since expected expenses for the time period have been completed or since the first user received a surplus/bonus pay. The system may then identify a third user task of initiating a resource transfer from the checking account to a savings account of the first user. Furthermore, based on analyzing the social media updates of the first user, the system may identify that the user has recently relocated. The system may then identify a fourth user task of updating residence address information of the first user.

Next, the system may identify a plurality of distributed systems associated with performing the plurality of user tasks. Typically, each of the distributed systems is structured to facilitate performing at least one of the plurality of user tasks using respective native user interfaces. Continuing with the previous example, the system may identify a first distributed system 184*a* (not illustrated) (e.g., an automobile loan system) of the plurality of systems 184 that comprises a first graphical action interface associated with performing at least one of the plurality of user tasks (e.g., purchase of the automobile loan). Similarly, the system may identify a second system 184*b* (e.g., an insurance system) (not illustrated) of the plurality of systems 184, and a second graphical action interface of the insurance system associated with purchase of the insurance product. Similarly, the system may identify that the financial institution system 182 is configured to perform the third and fourth user tasks of initiating the savings resource transfer and updating the user address information, and subsequently identify the respective interfaces of the system 1182 that facilitate these tasks.

Typically, each of the distributed systems comprise a plurality of interfaces for a variety of tasks. In some embodiments, the system is configured to analyze the plurality of interfaces of a first activity application for performing the first task, associated with the first system, to determine the first graphical action interface associated with performing at least one of the plurality of user tasks (e.g., first task). For example, the system may identify that a first graphical action interface 312 (illustrated in FIG. 3) of the first system is configured for facilitating the performance of the first task. Similarly, the system may identify that a second graphical action interface 322 (illustrated in FIG. 3) of the second system is configured for facilitating the performance of the second task.

In some embodiment, the suitable interfaces (interfaces 310, 320 illustrated in FIG. 3) identified by the system may comprises multiple graphical elements and data. Here, the system may analyze the interface to identify a first portion (e.g., portion 318 illustrated in FIG. 3) of the first graphical action interface that is associated with performing at least one of the plurality of user tasks. For instance, the system may identify that the first portion comprises data (e.g., first user task data element 316*b*) and functionality (e.g., first user task authentication element 316*a* and first user task input element 316*c*) for performing the first task, while the rest of the interface (e.g., portions 314*a* and 314*b* illustrated in FIG. 3) is not required for performing the first task. For instance, for the second interface 322 illustrated in FIG. 3, the system may identify that a first portion 328 comprises data (e.g., second user task element 326*a*) and functionality (e.g., second user task input element 326*b*) for performing the second task, while the rest of the interface (e.g., portion 324) is not required for performing the second task.

Next, as indicated by block 230, the system constructs an integrated graphical user interface comprising a composite interface of the first graphical action interface and the second graphical action interface. For example, the system may construct a composite interface 330 (illustrated in FIG. 3), by embedding/inserting the first portion 318 of the first graphical action interface 312 extracted from the first system (e.g., elements 336*a*-336*c* corresponding to elements 316*a*-316*c* respectively) and the first portion 328 of the second graphical action interface 322 extracted from the second system (e.g., elements 346*a*-346*b* corresponding to elements 326*a*-326*b* respectively) into an integrated graphical interface 332, as indicated by interface portion 340 in FIG. 3. As such, the composite interface is constructed such that the embedded portions extracted from the disparate systems retain their functionality and at least a portion of their aesthetic appearance, as that would be available if accessed separately at the respective systems.

In some embodiments, the system also inserts other graphical elements and data that may be required for the communication session, such as account/resource data (e.g., first user resource data 334*a* illustrated in FIG. 3), historical data (e.g., first user historical activity data), and social media data (e.g., first user social media data 334*c*) into the integrated interface 332.

Subsequently, the system identifies optimal devices and modes of presentation of the constructed integrated interface to the entity user 150. In particular, the system identifies a plurality of display devices associated with the entity system, as indicated by block 240. Here the system may identify that the entity system 106 comprises multiple display devices such as screens, monitors, touch screens, computing devices, and the like. The system may then determine a first display device of the plurality of display devices to be the most optimal for the display of the integrated interface. The system may identify the first display device based on at least (i) determining that the first display device is configured to display the integrated graphical user interface (e.g., to ensure compatibility), (ii) determining that the first display device is within a predetermined proximity of a location of the entity user (e.g., to ensure that the entity user is close enough to the display device to adequately perceive the interface), (iii) determining that the entity user is currently active on the first display device (e.g., to ensure that the entity user readily perceived the interface), and (iv) determining that an auxiliary entity user (e.g., another user) is not currently active on the first display device (e.g., to ensure that the interface is not perceived by unauthorized individuals), as indicated by block 250.

In some embodiments, the system may determine that the entity user is currently active on the first display device based on at least determining (i) that the entity user is currently perceiving/viewing the display of the first display device or that the display of the first display device in in the like of sight of the entity user and/or (ii) that the entity user has been perceiving/viewing the display of the first display device for at least a predetermined time period. In this regard, the system may analyze signals from visual capture devices (e.g., camera devices 160*c*), proximity sensor devices and the like to determine that a user view zone (e.g., an area currently being viewed by the entity user) associated with the entity user matches (e.g., at least overlaps) a display area associated with the first display device. For instance, FIG. 4 illustrates one instance of the user view zone 450, of the entity user 150's field of view, overlapping a display area 412 of a first display device 160*a*, and not matching/overlapping a display area 422 of a second display device 160*b*. In some embodiments, the system may determine that the entity user is currently active on the first display device based on identifying that the entity user 150 performed a predetermined action associated with the first display device within a predetermined preceding time interval. The predetermined actions may comprise actions performed on the displayed interface (e.g., mouse clicks, data entry, etc.), use of associate devices such as keyboards or pointers/mouse devices, predetermined spatial gestures, predetermined voice commands, and/or the like.

As indicated by block 260, the system is structured to determine that a user view zone of the entity user matches a display area associated with the first display device. Next, at block 270, the system is configured to initiate presentation of the integrated graphical user interface on a first display device associated with the entity system. Here, in some embodiments, the system presents or overlays a display of the integrated interface on the entirety of the display area of the first display device. In some embodiments, the system initiates display of the integrated graphical user interface on a display portion of the display area of the first display device that overlaps the user view zone of the entity user. For example, FIG. 4 illustrates one instance of presentation of the integrated interface 432 in a display portion 412a of the display area 412 of a first display device 160a that overlaps the user view zone 450, of the entity user 150's field of view, and not at a display portion 412b that does not overlap the user view zone 450. As another example, FIG. 5 illustrates presentation of the integrated interface in the instances where the user view zone overlaps two adjacent display devices 160a and 160b. As illustrated by FIG. 5, the system may display a first portion 532a of the integrated interface in a display portion of the display area 512 of the first display device 160a that overlaps the user view zone 550, and display the remaining second portion 532b of the integrated interface in a display portion of the display area 522 of the second display device 160b that overlaps the user view zone 550. This display of the integrated interface is dynamic and is structured to move within the display(s) along with changes to the entity user's view zone 550, in some embodiments.

In some embodiments, the integrated interface is dynamic, and is updated based on current conversation inputs received from the first user and/or the entity user throughout the communication session. For example, functionality associated with new tasks may be added based on an indication received from the first user, or existing functionality in the integrated interface for a particular task may be removed based on an indication that the first user does not wish to undertake the task.

In some embodiments, the system may determine that the first display device is currently turned off. Here, the system may transmit, to the entity system, a control signal that is configured to cause the entity system to turn on the first display device prior to displaying the integrated graphical user interface.

Subsequently, as indicated by block 290, the system may then initiate execution of a first user activity associated with the current communication session. Specifically, the entity user 150 may perform operations on the displayed integrated graphical user interface to perform one or more actions required for completing the first user activity.

FIG. 3 illustrates a schematic depiction 300 associated with construction of an integrated graphical user interface 332, in accordance with one embodiment of the present invention. As alluded to previously, the system typically constructs an integrated graphical user interface 332 comprising a composite interface 330 of multiple interfaces extracted from disparate systems. FIG. 3 illustrates the integrated graphical user interface 332 comprising a composite interface of a first graphical action interface 312 and a second graphical action interface 322.

As discussed, typically, each of the distributed systems 180 comprise a plurality of interfaces for a variety of tasks. After identifying a plurality of tasks associated with the first user, such as a first task and a second task, the system identifies suitable distributed systems and their interfaces for carrying out the identified tasks. In some embodiments, the system is configured to analyze the plurality of interfaces of a first activity application of a first distributed system associated with performing the first task, to determine the first graphical action interface 312 associated with performing the first task. For example, the system may identify that a first graphical action interface 312 of the first system is configured for facilitating the performance of the first task. Similarly, the system may identify that a second graphical action interface 322 of the second system is configured for facilitating the performance of the second task.

In some embodiment, the suitable interfaces (interfaces 310, 320) identified by the system may comprises multiple graphical elements and data. As illustrated, the first graphical action interface 312 of the first system may comprise a first system activity data element 314a, graphical elements and data elements as indicated by portion 314b, a first user task authentication element 316a, a first user task data element 316b, and a first user task input element 316c, etc. The second graphical action interface 322 of the second system may comprise a second user task authentication element 324, a second user task data element 326a, and a second user task input element 326b.

Next, the system may analyze each of the interfaces to identify a first portion (e.g., portion 318 of interface 312 and portion 328 of interface 322) of the interface that is associated with performing at least one of the plurality of user tasks. As illustrated, the system may identify that the first portion 318 of the interface 312 comprises data (e.g., first user task data element 316b) and functionality (e.g., first user task authentication element 316a and first user task input element 316c) for performing the first task, while the rest of the interface (e.g., portions 314a and 314b) is not required for performing the first task. Similarly, for the second interface 322, the system may identify that a first portion 328 comprises data (e.g., second user task element 326a) and functionality (e.g., second user task input element 326b) for performing the second task, while the rest of the interface (e.g., portion 324) is not required for performing the second task.

Next, as illustrated, the system typically constructs an integrated graphical user interface 332 comprising a composite interface 330 of the first graphical action interface 312 and the second graphical action interface 322. The system may construct a composite interface 330 by embedding/inserting the first portion 318 of the first graphical action interface 312 extracted from the first system (e.g., elements 336a-336c corresponding to elements 316a-316c respectively) and the first portion 328 of the second graphical action interface 322 extracted from the second system (e.g., elements 346a-346b corresponding to elements 326a-326b respectively) into an integrated graphical interface 332, as indicated by interface portion 340. As such, the composite interface 330 is constructed such that the embedded portions extracted from the disparate systems retain their functionality and at least a portion of their aesthetic appearance, as that would be available if accessed separately at the interfaces (312, 322) of the respective systems. In some embodiments, the system also inserts other graphical elements and data that may be required for the communication session, such as account/resource data (e.g., first user resource data 334a), historical data (e.g., first user historical activity data), and social media data (e.g., first user social media data 334c) into the integrated interface 332.

FIG. 4 illustrates a display environment 400 for presenting an integrated graphical user interface, in accordance with one embodiment of the present invention. In particular, FIG. 4 illustrates a display environment comprising a first display device 160a and an adjacent second display device 160b proximate the entity user 150. The first display device 160a comprises a first display device interface area 412 and the second display device 160b comprises a second display device interface area 422 where visual elements may be potentially displayed. The display environment also comprises a visual capture device or sensor device 160c for ascertaining the user view zone 450 of the entity user 150.

In particular, FIG. 4 illustrates one instance of the user view zone 450, of the entity user's field of view, overlapping a display area 412 of the first display device 160a, and not matching/overlapping a display area 422 of the second display device 160b. In particular, a portion 412a of the display area 412 of the first display device 160a overlaps the entity user's field of view 450, while the portion 412b of the first display device 160a and the graphical element portion 426 of the second display device 160b do not overlap the entity user's field of view 450. As discussed, the system is structured to determine that a user view zone of the entity user matches a display area associated with the first display device. The system may then initiate presentation of the integrated graphical user interface on the first display device associated with the entity system. Here, as illustrated, the system initiates display of the integrated graphical user interface 432 comprising a first user task input element 436a, a second user task data element 446a and first user resource data 434a, on the display portion 412a of the display area of the first display device 160a that overlaps the user view zone 450 of the entity user 150. For example, FIG. 4 illustrates one instance of presentation of the integrated interface 432 in a display portion 412a of the display area 412 of a first display device 160a that overlaps the user view zone 450, of the entity user 150's field of view, and not at a display portion 412b that does not overlap the user view zone 450.

FIG. 5 illustrates a display environment 500 for presenting an integrated graphical user interface, in accordance with one embodiment of the present invention. In particular, FIG. 5 illustrates a display environment comprising a first display device 160a and an adjacent second display device 160b proximate the entity user 150. The first display device 160a comprises a first display device interface area 512 and the second display device 160b comprises a second display device interface area 522 where visual elements may be potentially displayed. The display environment also comprises a visual capture device or sensor device 160c for ascertaining the user view zone 550 of the entity user 150.

In particular, FIG. 5 illustrates presentation of the integrated interface in the instances where the user view zone 550 overlaps two adjacent display devices 160a and 160b, e.g., when the entity user 150 turns or moves from the position illustrated in FIG. 4. In particular, a portion 512a of the display area 512 of the first display device 160a overlaps the entity user's field of view 550, while the portion 512b of the first display device 160a comprising graphical element(s) 516 does not overlap the entity user's field of view 550. Moreover, a portion 522a of the display area 522 of the second display device 160b overlaps the entity user's field of view 550, while the portion 522b of the second display device 160b comprising graphical element(s) 526 does not overlap the entity user's field of view 550. As illustrated by FIG. 5, the system may display the interface (or modify the display of FIG. 4 in real time with the movement of the entity user 150) such that a first portion 532a of the integrated interface (comprising elements 536 and 546a) is displayed in the display area 512 of the first display device 160a that overlaps the user view zone 550, and the remaining second portion 532b of the integrated interface (comprising elements 532b and 534a) is displayed in the display area 522 of the second display device 160b that overlaps the user view zone 550. This display of the integrated interface is dynamic and is structured to move within the display(s) along with changes to the entity user's view zone 550, in some embodiments.

FIG. 6 illustrates a high level process flow 600 directed to activity integration associated with a resource sharing management application, in accordance with one embodiment of the present invention. One or more of the steps described herein may be performed by the processing system 108, for example, in response to the processing device 138 executing computer readable instructions 142 of the processing system application 144, in some embodiments. Typically, the system is configured to initiate presentation of interfaces of an entity resource application 168 on display devices associated with the entity system 106. In this regard, the system is configured to transmit, store, activate and/or invoke the entity resource application 168 on the entity system 106.

As discussed, the system is structured to identify a current communication session between an entity system associated with an entity user and a user device associated with a first user, at block 610. Based on analyzing the conversation of the communication session, at block 620, the system is structured to determine a session input to be provided by the entity user to the first user during the current communication session. In some embodiments, the session input may comprise a request for information, a request for confirmation, a request for authentication credentials, a predetermined resource activity data, and the like that are required to be presented to the first user and/or that require a response from the first user for performing the first activity associated with the communication session. In some embodiments, the session input comprises indications or reminders regarding other identified user tasks, and the like that are required to be presented to the entity user prior to the end of the communication session. Typically, the system determined the session input based on at least (i) analyzing an audio input provided by the first user during the audio conversation between the entity user and the first user, and (ii) correlating the audio input with the activity data associated with the first user.

As indicated by block 630, the system transmits a trigger communication to the entity user via a first peripheral device associated with the entity system. Typically, the trigger communication comprises the session input to be provided by the entity user to the first user during the current communication session.

In some embodiments, the first peripheral device associated with the entity system is an audio head set 160d, a speaker or another device configured for relaying audio communications to the entity user. Here the system may identify whether the first peripheral device is currently adorned by the entity user. In the instances where the entity user is currently adorning the first peripheral device or otherwise has access to the first peripheral device, the system may transmit the trigger communication to first peripheral device in response to determining that the first user is not currently providing an audio input during the audio conversation between the entity user and the first user (so an so avoid sound interference for the entity user). The trigger communication is structured to cause the first peripheral device to present the trigger communication to the entity user in an audio format. In some embodiments, the audio format comprises a sound level in a range below an average sound level of previous audio inputs of the first user received at the audio head set during the current communication session and above an absolute threshold of hearing (ATH), such that the entity user can differential between the audio communications received from the first user and the trigger communication and such that there is no sound interference. The sound level typically refers to sound intensity level, sound volume, sound tone and/or other parameters.

In some embodiments, the first peripheral device associated with the entity system is the first display device. Here, the system may transmit the trigger communication to first peripheral device such that the first peripheral device presents a visual display of the trigger communication to the entity user. This display may be presented on a display portion of a display area of the first display device that overlaps a user view zone of the entity user as discussed previously. In some embodiments, the trigger communication is configured to cause the first peripheral device to apply a predetermined Gaussian blur to the display area of the first display device that is not associated with the trigger communication, or otherwise blur or defocus the display area of the first display device that is not associated with the trigger communication, as will be described with respect to FIG. 7.

In some embodiments, the system is configured to monitor the communication session to ensure that the entity user conveyed the session input to the first user. In the event that the entity user did not convey the session input to the first user within a predetermined time interval, the system may re-transit the trigger communication to the entity user.

Subsequently, the system initiates execution of a first user activity associated with the current communication session based on at least (i) determining that the entity user has provided the session input to the first user via the audio conversation in response to the trigger communication, and (ii) receiving a user response associated with the session input, as indicated by block 640. In some embodiments, the system may validate the user resource prior to executing the first user activity.

FIG. 7 illustrates a display environment 700 for presenting a trigger communication, in accordance with one embodiment of the present invention. In particular, FIG. 6 illustrates instances where the first peripheral device associated with the entity system is the first display device. Here, the system may transmit the trigger communication to first peripheral device 160a such that the first peripheral device 160a presents a visual display of the trigger communication (e.g., trigger communication display element 760) to the entity user. This display may be presented on a display portion 714 of a display area of the first display device 160a that overlaps a user view zone 750 of the entity user 750, as discussed previously. FIG. 700 also illustrates the entity user 150 adorning a headset device 160d. As discussed, in some embodiments, the trigger communication is configured to cause the first peripheral device to apply a predetermined Gaussian blur to the display area 716 of the first display device 160a that is not associated with the trigger communication, or otherwise blur or defocus or overlay opaque elements on the display area 716 of the first display device that is not associated with the trigger communication.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for real-time processing of data and dynamic delivery via an interactive interface, wherein the system is structured for establishing responsive communication with a distributed network, the system comprising:
   at least one memory device with computer-readable program code stored thereon;
   at least one communication device;
   at least one processing device operatively coupled to the at least one memory device and the at least one communication device, wherein executing the computer-readable code is configured to cause the at least one processing device to:
      identify a current communication session between an entity system associated with an entity user and a user device associated with a first user, wherein the communication session comprises an audio conversation between the entity user and the first user;
      construct an integrated graphical user interface based on at least analyzing activity data associated with the first user;
      initiate presentation of the integrated graphical user interface to the entity user on a first display device associated with the entity system, wherein initiating the presentation of the integrated graphical user interface on the first display device associated with the entity system further comprises:
         identifying a plurality of display devices associated with the entity system; and
         determining the first display device of the plurality of display devices based on at least (i) determining that the first display device is configured to display the integrated graphical user interface, (ii) determining that the first display device is within a predetermined proximity of a location of the entity user, (iii) determining that the entity user is currently active on the first display device, and (iv) determining that an auxiliary entity user is not currently active on the first display device;
      determine a session input to be provided by the entity user to the first user during the current communication session;
      display a trigger communication to the entity user via at least one of (i) the first display device and (ii) an audio head set associated with the entity system, wherein the trigger communication comprises the session input to be provided by the entity user to the first user during the current communication session; and
      initiate execution of a first user activity associated with the current communication session based on at least (i) determining that the entity user has provided the session input to the first user via the audio conversation in response to the trigger communication, and (ii) receiving a user response associated with the session input.

2. The system according to claim 1, wherein initiating the presentation of the integrated graphical user interface on the first display device associated with the entity system further comprises:
   determining that a user view zone of the entity user matches a display area associated with the first display device; and
   initiating display of the integrated graphical user interface on a display portion of the display area of the first display device that overlaps the user view zone of the entity user.

3. The system according to claim 2, wherein initiating the display of the integrated graphical user interface on the display portion of the display area that overlaps the user view zone further comprises:
   determining that the first display device is currently turned off; and
   transmitting, to the entity system, a control signal that is configured to cause the entity system to turn on the first display device prior to displaying the integrated graphical user interface.

4. The system according to claim 1, wherein determining that the entity user is currently active on the first display device comprises at least one of determining that a user view zone associated with the entity user matches a display area associated with the first display device, and identifying a predetermined action associated with the first display device performed by the entity user within a predetermined time interval.

5. The system according to claim 1, wherein displaying the trigger communication to the entity user via the audio head set further comprises:
   identifying that the audio head set is currently adorned by the entity user; and
   in response to determining that the first user is not currently providing an audio input during the audio conversation between the entity user and the first user, transmitting the trigger communication to the audio head set to cause the audio head set to present the trigger communication to the entity user in an audio format, wherein the audio format comprises a sound level in a range below an average sound level of previous audio inputs of the first user received at the audio head set during the current communication session and above an absolute threshold of hearing (ATH).

6. The system according to claim 1, wherein displaying the trigger communication to the entity user via the first display device further comprises:
   transmitting the trigger communication to the first display device to cause the first display device to present a visual display of the trigger communication to the entity user on a display portion of a display area of the first display device that overlaps a user view zone of the entity user, wherein the trigger communication is configured to cause the first display device to apply a predetermined Gaussian blur to the display area of the first display device that is not associated with the trigger communication.

7. The system according to claim 1, wherein constructing the integrated graphical user interface further comprises:
   determining a plurality of user tasks associated with the first user based on at least analyzing the activity data associated with the first user;
   identifying a plurality of distributed systems associated with performing the plurality of user tasks, wherein each of the distributed systems is structured to facilitate performing at least one of the plurality of user tasks;
   identifying, for a first system of the plurality of systems, a first graphical action interface associated with performing at least one of the plurality of user tasks;
   identifying, for a second system of the plurality of systems, a second graphical action interface associated with performing at least one of the plurality of user tasks; and
   constructing the integrated graphical user interface comprising a composite interface of the first graphical action interface and the second graphical action interface.

8. The system according to claim 7, wherein determining the plurality of user tasks further comprises:
   identifying the first user activity associated with the communication session between the entity user and the first user based on at least (i) analyzing an audio input provided by the first user during the audio conversation between the entity user and the first user, and (ii) correlating the audio input with the activity data associated with the first user; wherein the plurality of user tasks associated with the first user comprise the first user activity.

9. The system according to claim 7, wherein the activity data associated with the first user comprises historical activity data associated with the first user, user resource data and user social media data.

10. The system according to claim 7, wherein constructing the integrated graphical user interface comprising the composite interface further comprises:
    analyzing a plurality of interfaces of a first activity application associated with the first system to determine the first graphical action interface associated with performing at least one of the plurality of user tasks;
    identifying a first portion of the first graphical action interface that is associated with performing at least one of the plurality of user tasks; and
    constructing the integrated graphical user interface such that the composite interface comprises the first portion of the first graphical action interface.

11. The system according to claim 1, wherein determining the session input to be provided by the entity user to the first user during the current communication session further comprises:
    determining the session input based on at least (i) analyzing an audio input provided by the first user during the audio conversation between the entity user and the first user, and (ii) correlating the audio input with the activity data associated with the first user.

12. A computer program product for real-time processing of data and dynamic delivery via an interactive interface, the computer program product being structured for establishing responsive communication with a distributed network, the computer program product comprising a non-transitory computer-readable storage medium having computer-executable instructions to:
    identify a current communication session between an entity system associated with an entity user and a user device associated with a first user, wherein the communication session comprises an audio conversation between the entity user and the first user;
    construct an integrated graphical user interface based on at least analyzing activity data associated with the first user;
    initiate presentation of the integrated graphical user interface to the entity user on a first display device associated with the entity system, wherein initiating the presentation of the integrated graphical user interface on the first display device associated with the entity system further comprises:
       identifying a plurality of display devices associated with the entity system; and
       determining the first display device of the plurality of display devices based on at least (i) determining that the first display device is configured to display the integrated graphical user interface, (ii) determining that the first display device is within a predetermined proximity of a location of the entity user, (iii) determining that the entity user is currently active on the first display device, and (iv) determining that an auxiliary entity user is not currently active on the first display device;
    determine a session input to be provided by the entity user to the first user during the current communication session;
    display a trigger communication to the entity user via at least one of (i) the first display device and (ii) an audio head set associated with the entity system, wherein the trigger communication comprises the session input to be provided by the entity user to the first user during the current communication session; and
    initiate execution of a first user activity associated with the current communication session based on at least (i) determining that the entity user has provided the session input to the first user via the audio conversation in response to the trigger communication, and (ii) receiving a user response associated with the session input.

13. The computer program product according to claim 12, wherein initiating the presentation of the integrated graphical user interface on the first display device associated with the entity system further comprises:
    determining that a user view zone of the entity user matches a display area associated with the first display device; and
    initiating display of the integrated graphical user interface on a display portion of the display area of the first display device that overlaps the user view zone of the entity user.

14. The computer program product according to claim 13, wherein initiating the display of the integrated graphical user interface on the display portion of the display area that overlaps the user view zone further comprises:
    determining that the first display device is currently turned off; and
    transmitting, to the entity system, a control signal that is configured to cause the entity system to turn on the first display device prior to displaying the integrated graphical user interface.

15. The computer program product according to claim 12, wherein determining that the entity user is currently active on the first display device comprises at least one of determining that a user view zone associated with the entity user matches a display area associated with the first display device, and identifying a predetermined action associated with the first display device performed by the entity user within a predetermined time interval.

16. The computer program product according to claim 12, wherein displaying the trigger communication to the entity user via the audio head set further comprises:
    identifying that the audio head set is currently adorned by the entity user; and
    in response to determining that the first user is not currently providing an audio input during the audio conversation between the entity user and the first user, transmitting the trigger communication to the audio head set to cause the audio head set to present the trigger communication to the entity user in an audio format, wherein the audio format comprises a sound level in a range below an average sound level of previous audio inputs of the first user received at the audio head set during the current communication session and above an absolute threshold of hearing (ATH).

17. A method for real-time processing of data and dynamic delivery via an interactive interface, the method being configured for establishing responsive communication with a distributed network, the method comprising:
    identifying a current communication session between an entity system associated with an entity user and a user device associated with a first user, wherein the communication session comprises an audio conversation between the entity user and the first user;
    constructing an integrated graphical user interface based on at least analyzing activity data associated with the first user;
    initiating presentation of the integrated graphical user interface to the entity user on a first display device associated with the entity system, wherein initiating the presentation of the integrated graphical user interface on the first display device associated with the entity system further comprises:
        identifying a plurality of display devices associated with the entity system; and
        determining the first display device of the plurality of display devices based on at least (i) determining that the first display device is configured to display the integrated graphical user interface, (ii) determining that the first display device is within a predetermined proximity of a location of the entity user, (iii) determining that the entity user is currently active on the first display device, and (iv) determining that an auxiliary entity user is not currently active on the first display device;
    determining a session input to be provided by the entity user to the first user during the current communication session;
    displaying a trigger communication to the entity user via at least one of (i) the first display device and (ii) an audio head set associated with the entity system, wherein the trigger communication comprises the session input to be provided by the entity user to the first user during the current communication session; and
    initiating execution of a first user activity associated with the current communication session based on at least (i) determining that the entity user has provided the session input to the first user via the audio conversation in response to the trigger communication, and (ii) receiving a user response associated with the session input.

18. The method according to claim 17, wherein initiating the presentation of the integrated graphical user interface on the first display device associated with the entity system further comprises:
    determining that a user view zone of the entity user matches a display area associated with the first display device; and
    initiating display of the integrated graphical user interface on a display portion of the display area of the first display device that overlaps the user view zone of the entity user.

19. The method according to claim 18, wherein initiating the display of the integrated graphical user interface on the display portion of the display area that overlaps the user view zone further comprises:
    determining that the first display device is currently turned off; and
    transmitting, to the entity system, a control signal that is configured to cause the entity system to turn on the first display device prior to displaying the integrated graphical user interface.

20. The method according to claim 17, wherein determining that the entity user is currently active on the first display device comprises at least one of determining that a user view zone associated with the entity user matches a display area associated with the first display device, and identifying a predetermined action associated with the first display device performed by the entity user within a predetermined time interval.

* * * * *